(12) United States Patent
Lovitt et al.

(10) Patent No.: US 11,068,668 B2
(45) Date of Patent: Jul. 20, 2021

(54) NATURAL LANGUAGE TRANSLATION IN AUGMENTED REALITY(AR)

(71) Applicant: Facebook Technologies, LLC, Menlo Park, CA (US)

(72) Inventors: Andrew Lovitt, Redmond, WA (US); Antonio John Miller, Woodinville, WA (US); Philip Robinson, Seattle, WA (US); Scott Selfon, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 133 days.

(21) Appl. No.: 16/170,639

(22) Filed: Oct. 25, 2018

(65) Prior Publication Data
US 2020/0134026 A1    Apr. 30, 2020

(51) Int. Cl.
| | |
|---|---|
| *G06F 40/58* | (2020.01) |
| *G10L 15/22* | (2006.01) |
| *G10K 11/178* | (2006.01) |
| *H04S 7/00* | (2006.01) |
| *G10L 15/18* | (2013.01) |
| *G10L 13/00* | (2006.01) |

(52) U.S. Cl.
CPC ........ *G06F 40/58* (2020.01); *G10K 11/17823* (2018.01); *G10L 13/00* (2013.01); *G10L 15/1807* (2013.01); *G10L 15/22* (2013.01); *H04S 7/303* (2013.01); *G10K 2210/3044* (2013.01)

(58) Field of Classification Search
None
See application file for complete search history.

(56) References Cited

U.S. PATENT DOCUMENTS

| | | | | |
|---|---|---|---|---|
| 7,957,969 | B2 * | 6/2011 | Alewine | ................. G10L 13/08 704/243 |
| 8,290,775 | B2 * | 10/2012 | Etezadi | ................... G10L 13/08 704/231 |
| 8,645,140 | B2 * | 2/2014 | Lobzakov | ............... G10L 13/00 379/142.17 |
| 9,922,641 | B1 * | 3/2018 | Chun | ..................... G10L 13/033 |
| 9,961,435 | B1 * | 5/2018 | Goyal | ..................... G10L 25/84 |
| 10,189,434 | B1 * | 1/2019 | Casaburo | ........... G01C 21/3664 |
| 10,791,404 | B1 * | 9/2020 | Lasky | ..................... G10L 25/27 |

(Continued)

*Primary Examiner* — Fariba Sirjani
(74) *Attorney, Agent, or Firm* — FisherBroyles, LLP

(57) ABSTRACT

The disclosed computer-implemented method for performing natural language translation in AR may include accessing an audio input stream that includes words spoken by a speaking user in a first language. The method may next include performing active noise cancellation on the words in the audio input stream so that the spoken words are suppressed before reaching a listening user. Still further, the method may include processing the audio input stream to identify the words spoken by the speaking user, and translating the identified words spoken by the speaking user into a second, different language. The method may also include generating spoken words in the second, different language using the translated words, and replaying the generated spoken words in the second language to the listening user. Various other methods, systems, and computer-readable media are also disclosed.

20 Claims, 8 Drawing Sheets

(56) References Cited

U.S. PATENT DOCUMENTS

| | | | |
|---|---|---|---|
| 2004/0044517 A1* | 3/2004 | Palmquist | G06F 40/55 704/7 |
| 2005/0131709 A1* | 6/2005 | Creamer | G10L 19/018 704/277 |
| 2008/0133245 A1* | 6/2008 | Proulx | G06F 40/55 704/277 |
| 2009/0248395 A1* | 10/2009 | Alewine | G10L 13/08 704/7 |
| 2009/0281789 A1* | 11/2009 | Waibel | G06F 40/40 704/3 |
| 2010/0185432 A1* | 7/2010 | Almagro | H04R 5/033 704/2 |
| 2010/0198577 A1* | 8/2010 | Chen | G10L 15/07 704/2 |
| 2010/0250231 A1* | 9/2010 | Almagro | G06F 40/58 704/2 |
| 2011/0044438 A1* | 2/2011 | Wang | G10L 15/26 379/93.02 |
| 2011/0098056 A1* | 4/2011 | Rhoads | G09G 5/00 455/456.1 |
| 2012/0029912 A1* | 2/2012 | Almagro | G10K 11/17873 704/226 |
| 2012/0035914 A1* | 2/2012 | Brun | G06F 40/263 704/9 |
| 2012/0120218 A1* | 5/2012 | Flaks | H04S 7/303 348/77 |
| 2012/0253785 A1* | 10/2012 | Hamid | G06F 40/58 704/4 |
| 2012/0324505 A1* | 12/2012 | Casagrande | H04N 21/4307 725/32 |
| 2013/0211815 A1* | 8/2013 | Seligman | G06F 40/268 704/2 |
| 2014/0303958 A1* | 10/2014 | Lee | G10L 13/08 704/2 |
| 2015/0230033 A1* | 8/2015 | Sprague | G02C 5/006 381/313 |
| 2016/0165350 A1* | 6/2016 | Benattar | H04S 7/304 381/310 |
| 2017/0076713 A1* | 3/2017 | Gildein, II | H04N 7/15 |
| 2017/0243582 A1* | 8/2017 | Menezes | G10L 13/033 |
| 2018/0007489 A1* | 1/2018 | Lehtiniemi | G06F 3/167 |
| 2018/0197545 A1* | 7/2018 | Willett | G10L 15/005 |
| 2018/0213344 A1* | 7/2018 | Laaksonen | H04S 7/303 |
| 2018/0246698 A1* | 8/2018 | Huang | A63F 13/65 |
| 2019/0246236 A1* | 8/2019 | Ehara | H04S 7/305 |
| 2019/0278555 A1* | 9/2019 | Carvajal | G06F 3/017 |
| 2019/0341055 A1* | 11/2019 | Krupka | G10L 17/04 |
| 2020/0058289 A1* | 2/2020 | Gabryjelski | G10L 17/00 |
| 2020/0058389 A1* | 2/2020 | Saalbach | G06N 3/04 |
| 2020/0073889 A1* | 3/2020 | Sakamoto | G06F 40/279 |

* cited by examiner

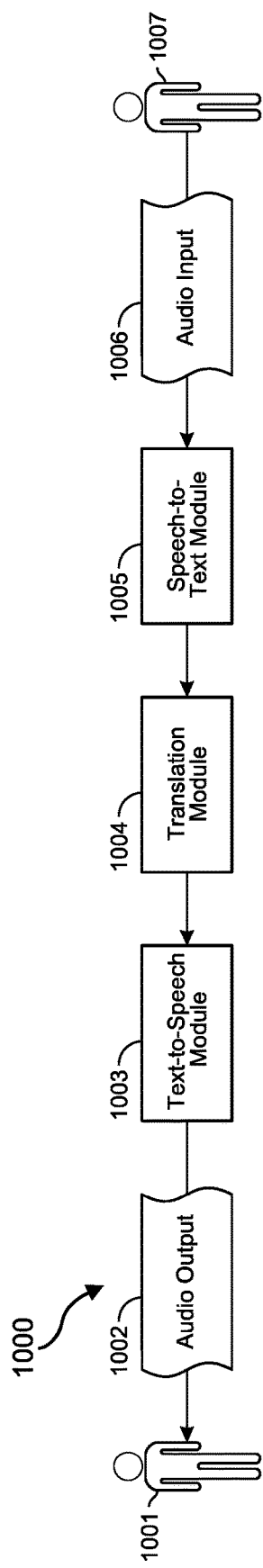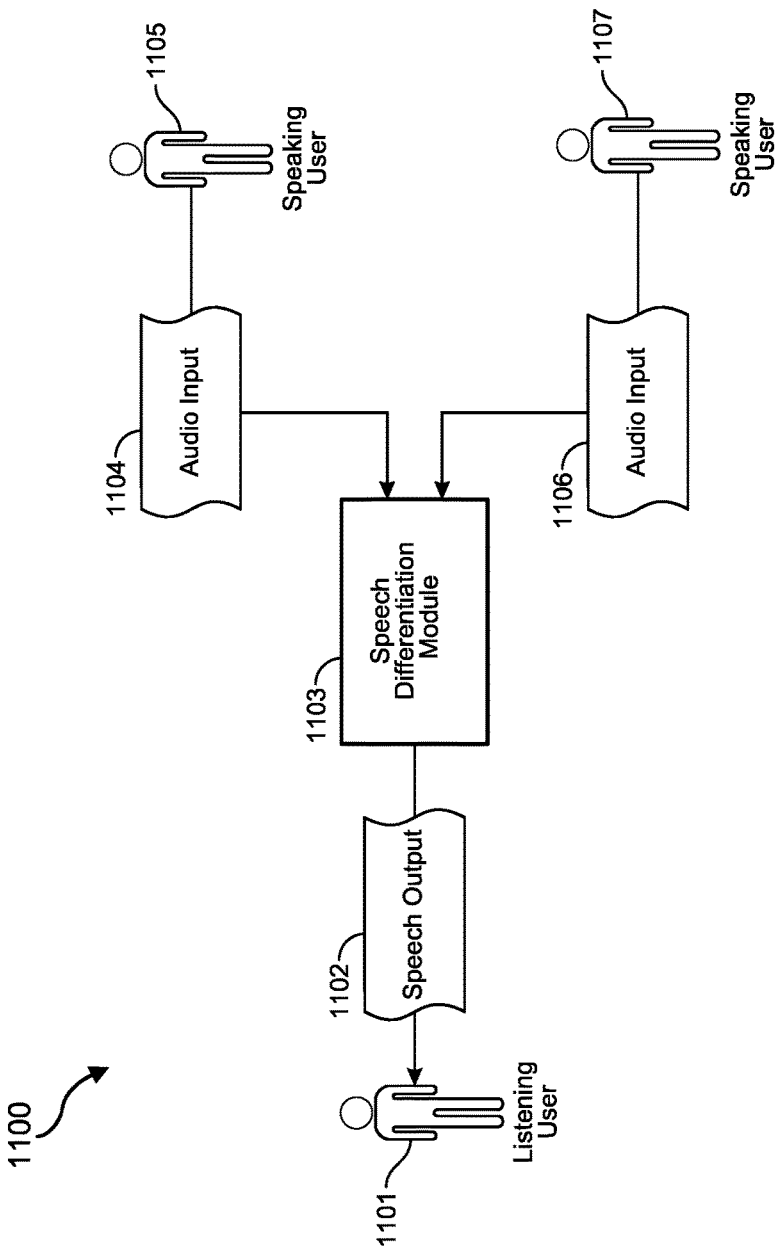
FIG. 10
FIG. 11

NATURAL LANGUAGE TRANSLATION IN AUGMENTED REALITY(AR)

BACKGROUND

Modern smartphones and other electronic devices are capable of performing a wide variety of functions. Many of these functions are provided by the phone's core operating system, and many additional functions may be added through applications. One piece of functionality that now comes built in to most modern smartphones is a function referred to as "text-to-speech" or TTS.

TTS allows a user to type a word or phrase into an electronic device, and the electronic device will render a computerized voice saying the written words. TTS functionality may also be used to read documents or books back to the user. The converse of TTS is speech-to-text (STT), which is also typically provided by most modern smartphones.

Still further, many smartphones can run applications that perform language translation. For instance, in some cases, a user may initiate an application that listens for voice input in one language, translates the words into another language, and then plays the words in the translated language back to the user. In other cases, the application may translate the words, and present the words in written form back to the user.

SUMMARY

As will be described in greater detail below, the instant disclosure describes methods of communicating with a person that speaks another language. In contrast to traditional techniques, however, the embodiments herein implement active noise cancellation to mute the person speaking in the foreign language and play back for the listening user a translation of the foreign speaker's words. Thus, while the listening user would see the foreign speaker's lips moving, the listening user would only hear a translated version of the foreign speaker's words. By removing the foreign speaker's words, and replacing them with words the listener understands, the listener will have a much easier time understanding the speaker. Instead of hearing both the foreign speaker and the translation at the same time, or having to wait while the foreign speaker speaks, and then a translated version is output, the systems herein operate in real-time so that the listener hears a translated version of the foreign speaker's words substantially as the foreign speaker speaks them. Moreover, instead of hearing both the foreign speaker's words and the translated words, due to the implementation of active noise cancellation, the listening user will only hear the translated words. This will greatly enhance the listening user's understanding of the conversation and will allow people to communicate with greater ease and with a higher level of understanding.

In some cases, the active noise cancellation and translation features may be provided on augmented reality (AR) or virtual reality (VR) devices. Indeed, in one example, a listening user wearing an AR headset may converse with a foreign speaker speaking a language the listening user does not understand. As the foreign speaker speaks, active noise cancellation may be applied to the foreign speaker's words by the listening user's AR headset. Then, in an earpiece or through other audible means, the foreign speaker's translated words are played back to the listening user through the AR head set. This may occur in real time and, as such, the listening user may follow the foreign speaker's words clearly and accurately. In such embodiments, the listening user would only hear a translated version of the foreign speaker's words and would not have to try to filter or disregard the foreign speaker's spoken words. If the foreign speaker was also wearing such an AR headset, the two could converse back and forth, each speaking in their native language, and each hearing replies in their native language without being encumbered by the speaker's actual words (which would be unintelligible to the listener anyway). Still further, in some embodiments, the voice speaking the translated words to the listener may be personalized to sound as if it came from the foreign speaking user.

In one example, a computer-implemented method for performing natural language translation in AR may include accessing an audio input stream received from a speaking user. The audio input stream may include words spoken by the speaking user in a first language. The method may next include performing active noise cancellation on the words in the audio input stream received from the speaking user so that the spoken words are suppressed before reaching a listening user. Still further, the method may include processing the audio input stream to identify the words spoken by the speaking user, and translating the identified words spoken by the speaking user into a second, different language. The method may also include generating spoken words in the second, different language using the translated words, and replaying the generated spoken words in the second language to the listening user.

In some examples, the generated spoken words may be personalized to the speaking user, so that the generated spoken words in the second language sound as if spoken by the speaking user. In some examples, personalizing the generated spoken words may further include processing the audio input stream to determine how the speaking user pronounces various words or syllables, and applying the determined pronunciations to the generated spoken words. During replay of the generated spoken words, personalization may be applied dynamically to the replayed words as the computer determines how the speaking user pronounces the words or syllables. In some examples, the speaking user may provide voice samples. These voice samples may be used to determine how the speaking user pronounces the words or syllables prior to receiving the audio input stream.

In some examples, replaying the generated spoken words to the listening user may further include determining which direction the speaking user is speaking from and spatializing playback of the generated spoken words to sound as if the spoken words are coming from the determined direction of the speaking user. Determining which direction the speaking user is speaking from may include receiving location data for a device associated with the speaking user, determining which direction the speaking user is speaking from based on the received location data, and spatializing playback of the generated spoken words to sound as if the spoken words are coming from the determined direction of the speaking user.

In some examples, determining which direction the speaking user is speaking may further include calculating a direction of arrival for sound waves coming from the speaking user, determining which direction the speaking user is speaking from based on the calculated direction of arrival, and spatializing playback of the generated spoken words to sound as if the spoken words are coming from the determined direction of the speaking user.

In some examples, determining which direction the speaking user is speaking from may further include tracking movement of the listening user's eyes, determining which direction the speaking user is speaking from based on the tracked movements of the listening user's eyes, and spatializing playback of the generated spoken words to sound as if the spoken words are coming from the determined direction of the speaking user.

In some examples, processing the audio input stream to identify the words spoken by the speaking user may include implementing a speech-to-text (STT) program to identify the words spoken by the speaking user, and a text-to-speech (TTS) program to generate the translated spoken words. The method may also include downloading a voice profile associated with the speaking user and using the downloaded voice profile associated with the speaking user to personalize the generated spoken words, so that the replayed generated spoken words in the second language sound as if spoken by the speaking user.

In some examples, the method may further include accessing stored audio data associated with the speaking user, and then using the accessed stored audio data to personalize the generated spoken words. As such, the generated spoken words replayed in the second language may sound as if spoken by the speaking user. In some examples, the method may further include parsing the words spoken by the speaking user, determining that at least one of the words is spoken in a language understood by the listening user, and pausing active noise cancellation for the words spoken in the language understood by the listening user.

In some examples, the audio input stream includes words spoken by at least two different speaking users. The method may then include differentiating between the two speaking users according to different voice patterns, and generating spoken words for a first speaking user, while performing active noise cancellation on both speaking users. Still further, in some examples, the method may include storing generated spoken words for the second speaking user until the first user has stopped talking for a specified amount of time, and then replaying the generated spoken words for the second speaking user.

In some examples, the method further includes creating a voice model for the second speaking user while the first speaking user is speaking. The method may also include personalizing the generated spoken words for each of the two speaking users, so that the generated spoken words in the second language sound as if coming from each speaking user's voice.

In addition, a corresponding system for performing natural language translation in AR may include several modules stored in memory, including an audio accessing module that accesses an audio input stream that includes words spoken by a speaking user in a first language. The system may also include a noise cancellation module that performs active noise cancellation on the words in the audio input stream so that the spoken words are suppressed before reaching a listening user. The system may further include an audio processing module that processes the audio input stream to identify the words spoken by the speaking user. A translation module may translate the identified words spoken by the speaking user into a second, different language, and a speech generator may generate spoken words in the second, different language using the translated words. A playback module may then replay the generated spoken words in the second language to the listening user.

In some examples, the above-described method may be encoded as computer-readable instructions on a computer-readable medium. For example, a computer-readable medium may include one or more computer-executable instructions that, when executed by at least one processor of a computing device, may cause the computing device to access an audio input stream that includes words spoken by a speaking user in a first language, perform active noise cancellation on the words in the audio input stream such that the spoken words are suppressed before reaching a listening user, process the audio input stream to identify the words spoken by the speaking user, translate the identified words spoken by the speaking user into a second, different language, generate spoken words in the second, different language using the translated words, and replay the generated spoken words in the second language to the listening user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 10 illustrates a computing architecture in which speech-to-text and text-to-speech modules are implemented in the process of performing natural language translation in AR.

FIG. 11 illustrates a computing architecture in which different users' speech is differentiated in preparation for performing natural language translation in AR.

Figure 1:
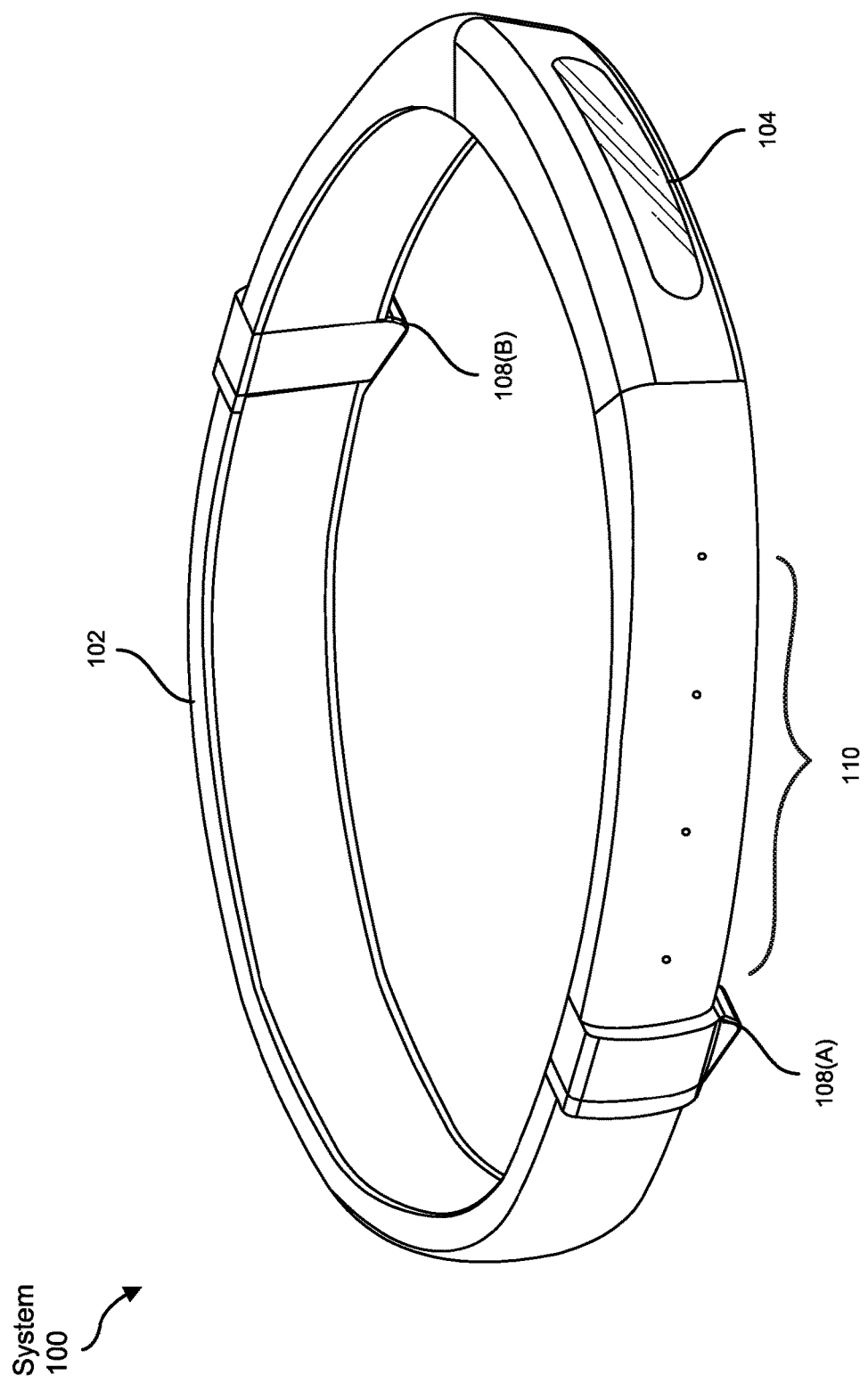
FIG. 1 illustrates an embodiment of an artificial reality headset.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to performing natural language translation in augmented reality (AR) or virtual reality (VR). As will be explained in greater detail below, embodiments of the instant disclosure may include performing noise cancellation on a speaking user's voice. For instance, if a speaking user speaks a language not understood by the listening user, the listening user will not understand the speaking user when they speak. Thus, the embodiments herein may perform noise cancellation on the speaking user's voice, such that the listening user does not hear the speaking user. While the speaking user's speech is being silenced by noise cancellation, the systems described herein may determine what words the speaking user is saying and may translate those words into the language understood by the listening user. The systems herein may also convert the translated words into speech which is played back into the user's ears via speakers or other sound transducers. In this manner, the listening user's ease of understanding the speaking user may improve significantly. Instead of having one user speak into an electronic device and wait for a translation, the embodiments herein may operate as the speaking user is speaking. Thus, as the speaking user speaks in one language, the listening user hears, in real-time, a generated voice speaking translated words to the listening user. This process may be seamless and automatic. Users may converse with each other, without delays, each speaking and hearing in their own native tongue.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 100 in FIG. 1. Other artificial reality systems may include an NED that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. AR system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, AR system 100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 100 may not include an NED, AR system 100 may include other types of screens or visual feedback devices (e.g., a display screen integrated into a side of frame 102).

Figure 2:
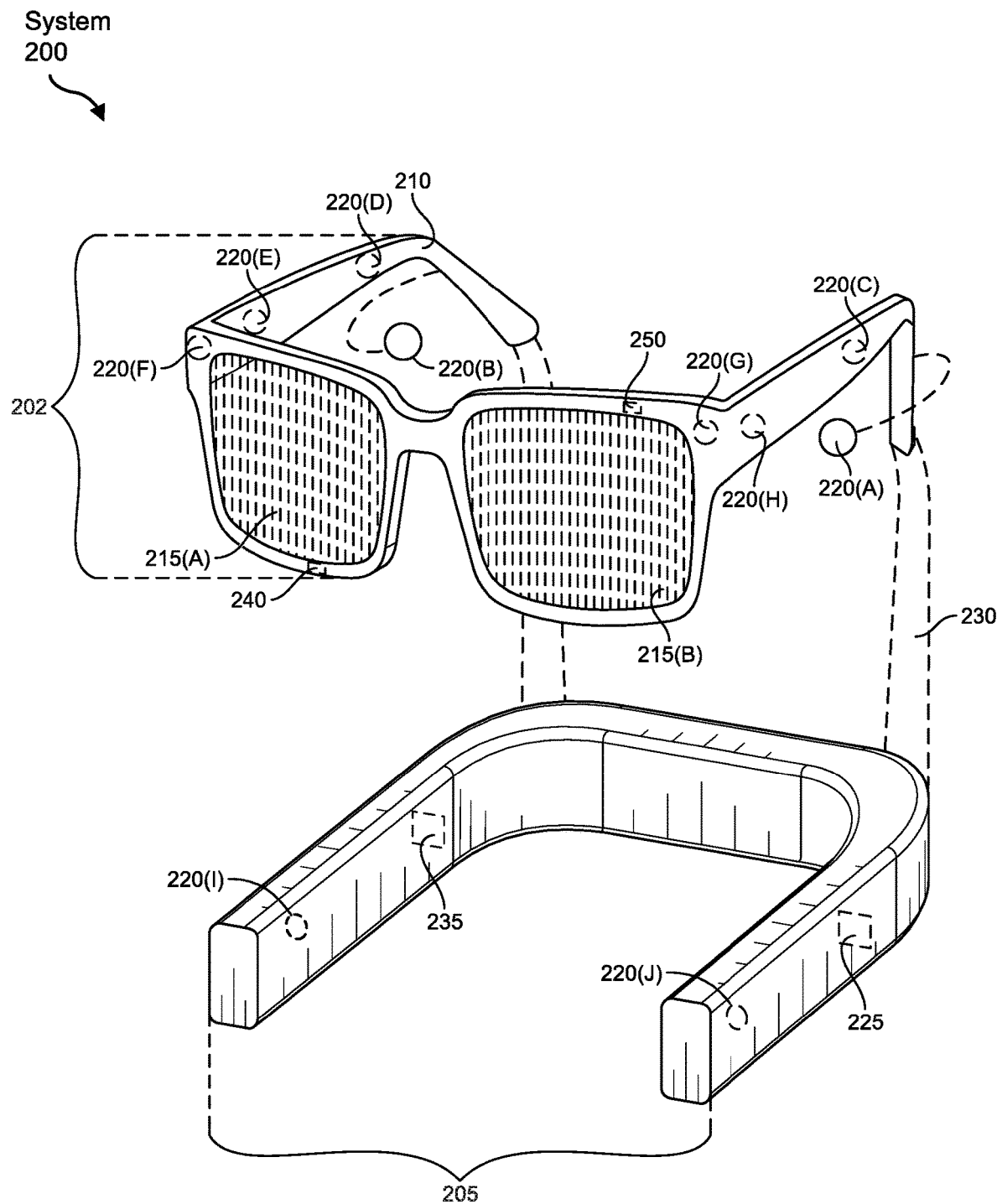
FIG. 2 illustrates an embodiment of an augmented reality headset and a corresponding neckband.

The embodiments discussed in this disclosure may also be implemented in AR systems that include one or more NEDs. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While AR system 200 includes two displays, embodiments of this disclosure may be implemented in AR systems with a single NED or more than two NEDs.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. In some embodiments, AR system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof.

AR system 200 may also include a microphone array with a plurality of acoustic sensors 220(A)-220(J), referred to collectively as acoustic sensors 220. Acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on frame 210, and/or acoustic sensors 220(I) and 220(J), which may be positioned on a corresponding neckband 205.

The configuration of acoustic sensors 220 of the microphone array may vary. While AR system 200 is shown in FIG. 2 as having ten acoustic sensors 220, the number of acoustic sensors 220 may be greater or less than ten. In some embodiments, using higher numbers of acoustic sensors 220 may increase the amount of audio information collected and/or the sensitivity and accuracy of the audio information. In contrast, using a lower number of acoustic sensors 220 may decrease the computing power required by the controller 250 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

Acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal. Having an acoustic sensor positioned next to an ear canal of a user may enable the microphone array to collect information on how sounds arrive at the ear canal. By positioning at least two of acoustic sensors 220 on either side of a user's head (e.g., as binaural microphones), AR device 200 may simulate binaural hearing and capture a 3D stereo sound field around about a user's head. In some embodiments, the acoustic sensors 220(A) and 220(B) may be connected to the AR system 200 via a wired connection, and in other embodiments, the acoustic sensors 220(A) and 220(B) may be connected to the AR system 200 via a wireless connection (e.g., a Bluetooth connection). In still other embodiments, the acoustic sensors 220(A) and 220(B) may not be used at all in conjunction with the AR system 200.

Acoustic sensors 220 on frame 210 may be positioned along the length of the temples, across the bridge, above or below display devices 215(A) and 215(B), or some combination thereof. Acoustic sensors 220 may be oriented such that the microphone array is able to detect sounds in a wide range of directions surrounding the user wearing the AR system 200. In some embodiments, an optimization process may be performed during manufacturing of AR system 200 to determine relative positioning of each acoustic sensor 220 in the microphone array.

AR system 200 may further include or be connected to an external device. (e.g., a paired device), such as neckband 205. As shown, neckband 205 may be coupled to eyewear device 202 via one or more connectors 230. The connectors 230 may be wired or wireless connectors and may include electrical and/or non-electrical (e.g., structural) components.

In some cases, the eyewear device 202 and the neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of the eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 205 may be communicatively coupled with eyewear device 202 and/or to other devices. The other devices may provide certain functions (e.g., tracking, localizing, depth mapping, processing, storage, etc.) to the AR system 200. In the embodiment of FIG. 2, neckband 205 may include two acoustic sensors (e.g., 220(1) and 220(J)) that are part of the microphone array (or potentially form their own microphone subarray). Neckband 205 may also include a controller 225 and a power source 235.

Acoustic sensors 220(1) and 220(J) of neckband 205 may be configured to detect sound and convert the detected sound into an electronic format (analog or digital). In the embodiment of FIG. 2, acoustic sensors 220(1) and 220(J) may be positioned on neckband 205, thereby increasing the distance between the neckband acoustic sensors 220(1) and 220(J) and other acoustic sensors 220 positioned on eyewear device 202. In some cases, increasing the distance between acoustic sensors 220 of the microphone array may improve the accuracy of beamforming performed via the microphone array. For example, if a sound is detected by acoustic sensors 220(C) and 220(D) and the distance between acoustic sensors 220(C) and 220(D) is greater than, e.g., the distance between acoustic sensors 220(D) and 220(E), the determined source location of the detected sound may be more accurate than if the sound had been detected by acoustic sensors 220(D) and 220(E).

Controller 225 of neckband 205 may process information generated by the sensors on neckband 205 and/or AR system 200. For example, controller 225 may process information from the microphone array that describes sounds detected by the microphone array. For each detected sound, controller 225 may perform a DoA estimation to estimate a direction from which the detected sound arrived at the microphone array. As the microphone array detects sounds, controller 225 may populate an audio data set with the information. In embodiments in which AR system 200 includes an inertial measurement unit, controller 225 may compute all inertial and spatial calculations from the IMU located on eyewear device 202. Connector 230 may convey information between AR system 200 and neckband 205 and between AR system 200 and controller 225. The information may be in the form of optical data, electrical data, wireless data, or any other transmittable data form. Moving the processing of information generated by AR system 200 to neckband 205 may reduce weight and heat in eyewear device 202, making it more comfortable to the user.

Power source 235 in neckband 205 may provide power to eyewear device 202 and/or to neckband 205. Power source 235 may include, without limitation, lithium ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more inertial measurement units (IMUs), one or more tracking emitters or detectors, and/or any other suitable device or system for creating an artificial reality experience.

Artificial reality systems may include a variety of types of visual feedback mechanisms. For example, display devices in AR system 200 and/or VR system 300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 200 and/or VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 100, AR system 200, and/or VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

Figure 3:
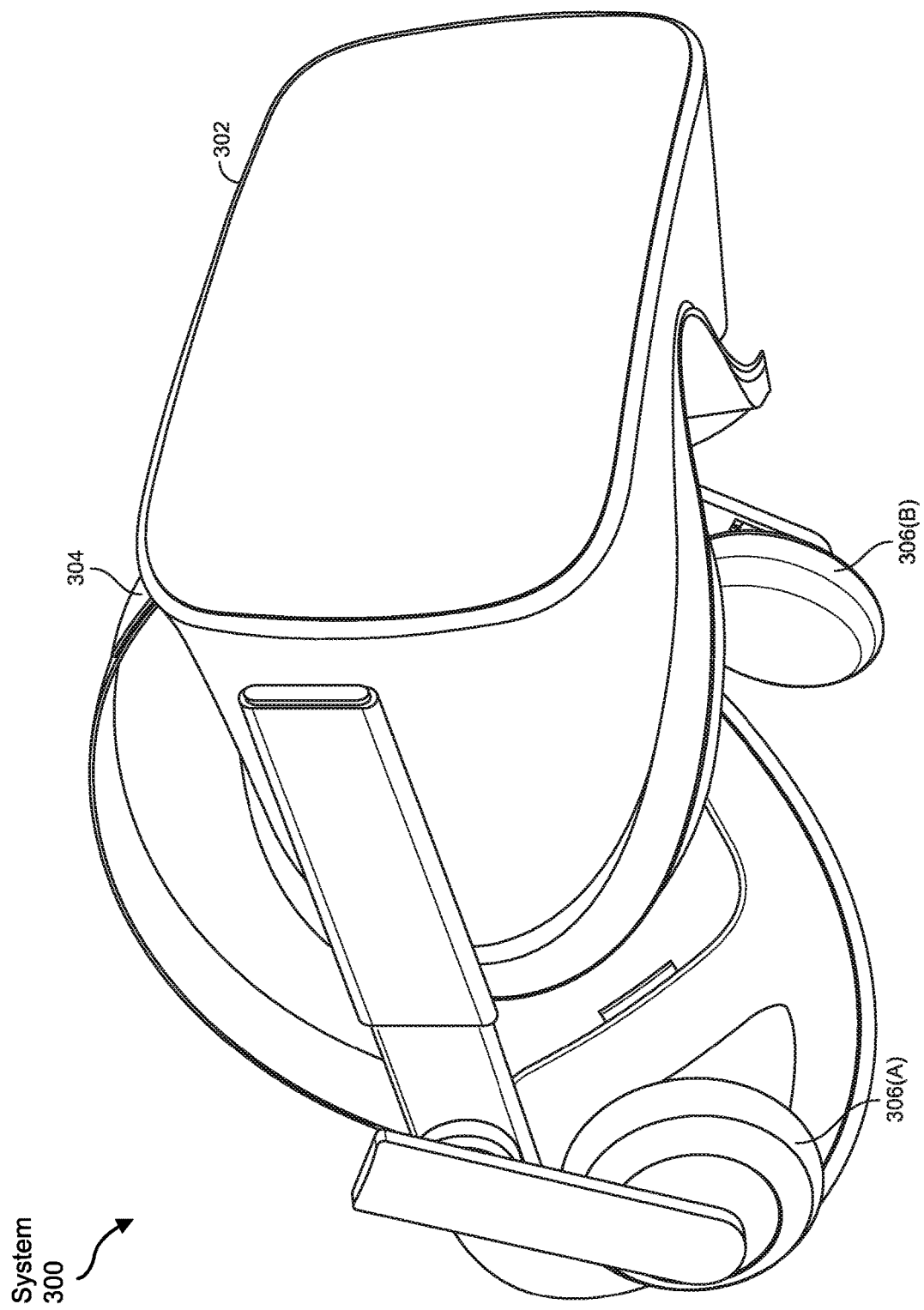
FIG. 3 illustrates an embodiment of a virtual reality headset.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 100, 200, or 300 of FIG. 1, 2, or 3, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a direction of arrival (DOA) analysis to determine the location of a sound source. The DOA analysis may include analyzing the intensity, spectra, and/or arrival time of each sound at the AR/VR device to determine the direction from which the sounds originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an artificial reality device may implement one or more microphones to listen to sounds within the user's environment. The AR or VR headset may use a variety of different array transfer functions (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, IR sensors, heat sensors, motion sensors, GPS receivers, or in some cases, sensor that detect a user's eye movements. For example, as noted above, an artificial reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Figure 4:
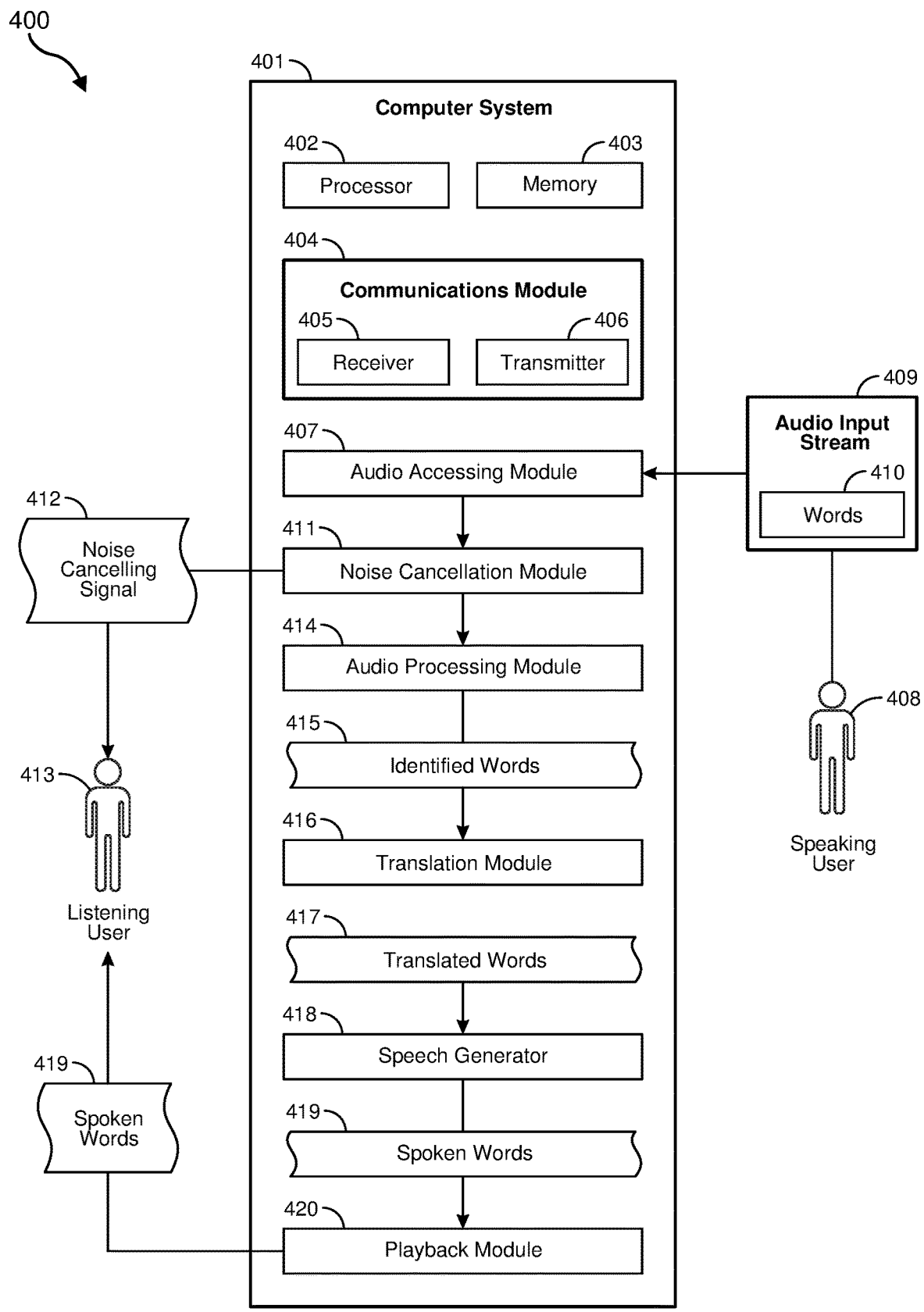
FIG. 4 illustrates a computing architecture in which embodiments described herein may operate including performing natural language translation in augmented reality (AR).

The following will provide, with reference to FIGS. 4-11, detailed descriptions of how natural language translation is performed in augmented reality. FIG. 4, for example, illustrates a computing architecture 400 in which many of the embodiments described herein may operate. The computing architecture 400 may include a computer system 401. The computer system 401 may include at least one processor 402 and at least some system memory 403. The computer system 401 may be any type of local or distributed computer system, including a cloud computer system. The computer system 401 may include program modules for performing a variety of different functions. The program modules may be hardware-based, software-based, or may include a combination of hardware and software. Each program module may use or represent computing hardware and/or software to perform specified functions, including those described herein below.

For example, communications module 404 may be configured to communicate with other computer systems. The communications module 404 may include any wired or wireless communication means that can receive and/or transmit data to or from other computer systems. These communication means may include radios including, for example, a hardware-based receiver 405, a hardware-based transmitter 406, or a combined hardware-based transceiver capable of both receiving and transmitting data. The radios may be WIFI radios, cellular radios, Bluetooth radios, global positioning system (GPS) radios, or other types of radios. The communications module 404 may be configured to interact with databases, mobile computing devices (such as mobile phones or tablets), embedded systems, or other types of computing systems.

The computer system 401 may also include other modules including an audio accessing module 407. The audio accessing module 407 may be configured to access a live (or stored) audio input stream 409. The audio input stream 409 may include one or more words 410 spoken by the speaking user 408. The words spoken by the speaking user 408 may be in a language that is (either partially or entirely) not understood by the listening user 413. The noise cancellation module 411 of computer system 401 may generate a noise cancellation signal 412 that is designed to cancel the audio input stream 409 received from the speaking user (i.e., the audio input stream received at a microphone on the computer system 401 or received at a microphone on an electronic device associated with the speaking user 408). Thus, in this manner, when the speaking user 408 speaks, the listening user may hear the noise cancelling signal 412 which cancels out and substantially silences the speaking user's words.

The audio processing module 414 of computer system 401 may be configured to identify one or more of the words 410 or phrases spoken by the speaking user 408. As will be recognized, the words 410 may include single words, phrases of words or complete sentences. These words or groups of words may be recognized and translated individually or may be recognized and translated collectively as phrases or sentences. Accordingly, while word identification and translation are chiefly described herein in the singular, it will be understood that these words 410 could be phrases or full sentences.

Each word 410 may be identified in the language spoken by the speaking user 408. Once the audio processing module 414 has identified one or more of the speaking user's words, the identified words 415 may be fed to the translation module 416. The translation module 416 may use dictionaries, databases, or other local or online resources to translate the identified words 415 into a specified language (e.g., the language spoken by listening user 413). The translated words 417 may then be fed to the speech generator 418. The speech generator 418 may generate spoken words 419 that convey the meaning of the speaking user's words 410. The spoken words 419 may be spoken by a computer-generated voice or, in some embodiments, may be personalized to sound as though they were spoken by the speaking user 408 themselves. These spoken words 420 are provided to the playback module 420 of computer system 401, where they are played back to the listening user 413. Thus, in this manner, active noise cancellation and language translation are combined to allow a speaking user to speak in their native tongue, and have the listening user hear only the translated version of the speaking user's words. These embodiments will be described in greater detail below with regard to method 500 of FIG. 5.

Figure 5:
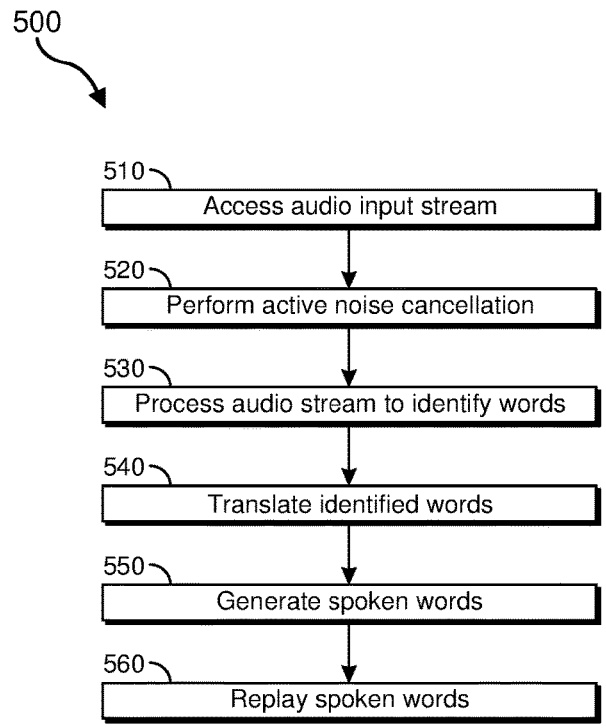
FIG. 5 illustrates a flow diagram of an exemplary method for performing natural language translation in AR.
Figure 6:
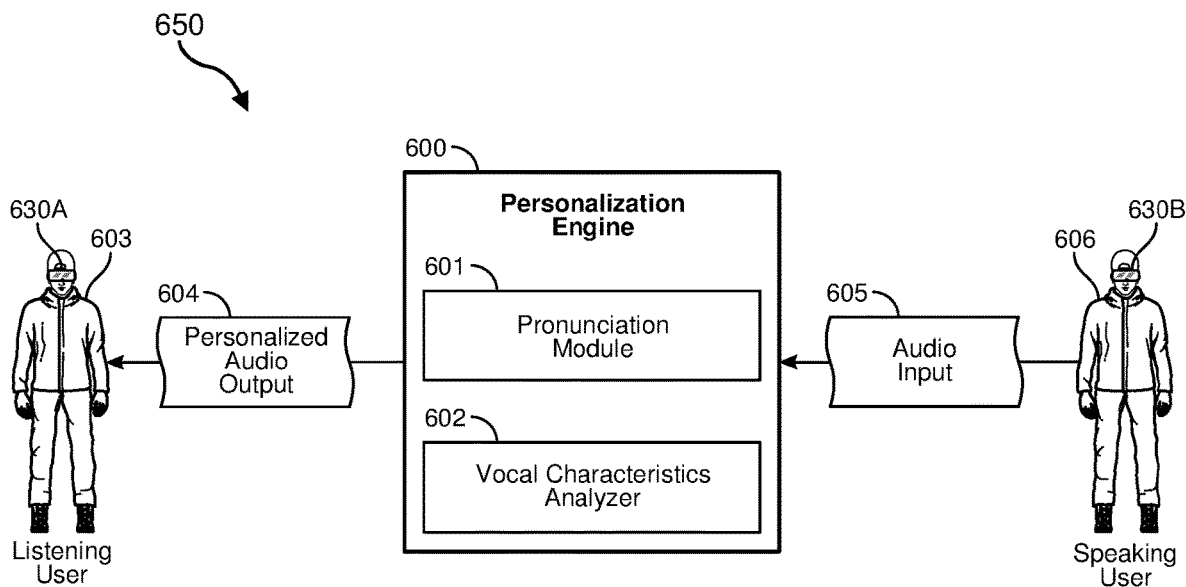
FIG. 6 illustrates a computing architecture in which natural language translation in AR may be personalized to a user.

FIG. 5 is a flow diagram of an exemplary computer-implemented method 500 for performing natural language translation in AR. The steps shown in FIG. 5 may be performed by any suitable computer-executable code and/or computing system, including the system(s) illustrated in FIG. 4. In one example, each of the steps shown in FIG. 5 may represent an algorithm whose structure includes and/or is represented by multiple sub-steps, examples of which will be provided in greater detail below.

As illustrated in FIG. 5, at step 510 one or more of the systems described herein may access an audio input stream that includes words spoken by a speaking user in a first language. For example, audio accessing module 407 may access audio input stream 409. The audio input stream 409 may include one or more words 410 spoken by speaking user 408. The audio input stream 409 may be live or prerecorded. The words 410 may be spoken in any language.

The method 500 may next include performing active noise cancellation on the words 410 in the audio input stream 409 so that the spoken words are suppressed before reaching a listening user (step 520). For example, noise cancellation module 411 of computer system 401 may generate a noise canceling signal 412 that is designed to suppress or reduce the intensity of the speaking user's voice or cancel out the speaking user's voice entirely. As such, when the speaking user 408 is speaking, the listening user 413 may not hear the speaking user's words or may only hear muffled or muted versions of the words. The noise canceling signal 412 may be used internally within the computer system 401 when providing playback to the listening user or may be sent to a device such as a head set or ear phones, where the noise canceling signal is used to silence the speaking user's voice. The noise canceling signal 412 may be turned up or down in intensity or may be turned off entirely if desired.

The method 500 may further include processing the audio input stream 409 to identify the words 410 spoken by the speaking user 408 (step 530), and translating the identified words spoken by the speaking user into a second, different language (step 540). The audio processing module 414 may process the audio input stream 409 to identify which words 410 were spoken by the speaking user 408. The audio processing module 414 may use speech-to-text (STT) algorithms, dictionaries, databases, machine learning techniques, or other programs or resources when identifying the words spoken by the speaking user 408. These identified words 415 are then provided to the translation module 416. The translation module 416 translates the identified words 415 into another language. This new language may be one that is spoken or at least understood by the listening user 413. These translated words 417 may then be provided to the speech generator 418 to generate spoken words.

Method 500 of FIG. 5 may next include generating spoken words in the second, different language using the translated words (step 550) and replaying the generated spoken words in the second language to the listening user (step 560). For instance, the speech generator 418 may receive the translated words 417 (e.g., as a string of digital text), and may generate spoken words 419 that correspond to the translated words. The speech generator 418 may use text-to-speech (TTS) algorithms or other resources including databases, dictionaries, machine learning techniques, or other applications or programs to generate the spoken words 419 from the translated words 417. The spoken words may sound as if spoken by a computer-generated voice or may be personalized (as will be explained further below) to sound as if spoken by the speaking user 408 themselves. Once the spoken words 419 have been generated, they may be passed to the playback module 420 for playback to the listening user 413. The spoken words may be sent to speakers that are part of computer system 401 or are connected to the computer system 401 via a wired or wireless connection. In this manner, the listening user 413 will hear spoken words representing a translation of the speaking user's words 410, while the noise canceling module 411 simultaneously ensures that the only thing heard by the listening user is the translated spoken words 419.

In some embodiments, the spoken words 419 may be played back via speakers on an augmented reality (AR), virtual reality (VR) or mixed reality (MR) headset (e.g., any of headsets 100, 200 or 300 of FIG. 1, 2 or 3, respectively). Although any of these forms of altered reality may be used in any of the embodiments described herein, the embodiments described below will deal chiefly with augmented reality. AR headsets (such as 630A in FIG. 6 worn by the listening user 603, or headset 630B worn by the speaking user 606) may include transparent lenses that allow users to see out into the outside world, while also having an inner reflective surface that allows images to be projected and reflected into the user's eyes. Thus, the user can see everything in their surroundings, but can also see virtual elements generated by the AR head set. Moreover, the AR head set may provide built-in speakers, or may have wired or wireless ear pieces that fit inside a user's ears. These speakers or ear pieces provide audio to the user's ears, whether the audio is music, video game content, movie or video content, speech or other forms of audio content. Thus, in at least some of the embodiments herein, the computer system 401, or at least some of the modules of computer system 401, may be built into an AR head set. Thus, the AR head set may perform noise cancellation, audio processing, translation, speech generation and playback through the speakers or ear pieces of the AR head set.

As mentioned above, the generated spoken words 419 may be personalized to the speaking user 408, so that the generated spoken words in the second language sound as if spoken by the speaking user 408. In many cases, it may be preferable to have the translated, spoken words 419 sound as if they were spoken by the speaking user 408, even though the speaking user cannot speak in that language. Such personalization provides a familiar tone and feel to the user's words. Personalization makes the words sound less mechanical and robot-like, and more familiar and personal. The embodiments herein are designed to craft the spoken words 419 to sounds just as if pronounced and spoken by the speaking user 408.

In some embodiments, personalizing the generated spoken words 419 may include processing the audio input stream 409 to determine how the speaking user pronounces various words or syllables. For instance, each user may pronounce certain words or syllables in a slightly different way. The personalization engine 600 in computing environment 650 of FIG. 6 may receive audio input 605 from a speaking user 606 and may activate the pronunciation module 601 to determine how the speaking user pronounces their words. The vocal characteristics analyzer 602 may analyze the audio input 605 to determine the speaking user's tone, word spacing and other vocal characteristics. The personalization engine 600 may then apply the determined pronunciations, tone of voice, and other vocal characteristics to the generated spoken words in the personalized audio output signal 604. This personalized audio output 604 is then provided to the listening user 603. During replay of the generated spoken words (e.g., through AR head set 630A), personalization may be applied dynamically to the replayed words as the personalization engine 600 or computer system 401 determines how the speaking user 606 pronounces the words or syllables.

Figure 7:
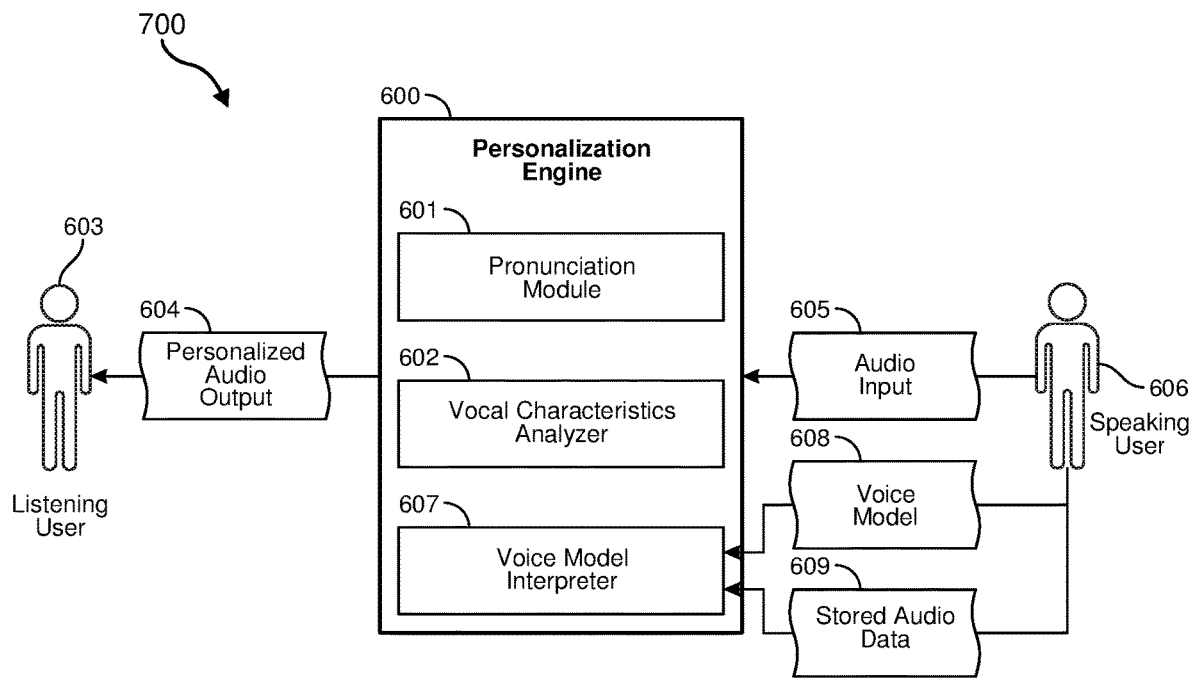
FIG. 7 illustrates an alternative computing architecture in which natural language translation in AR may be personalized to a user.
Figure 8:
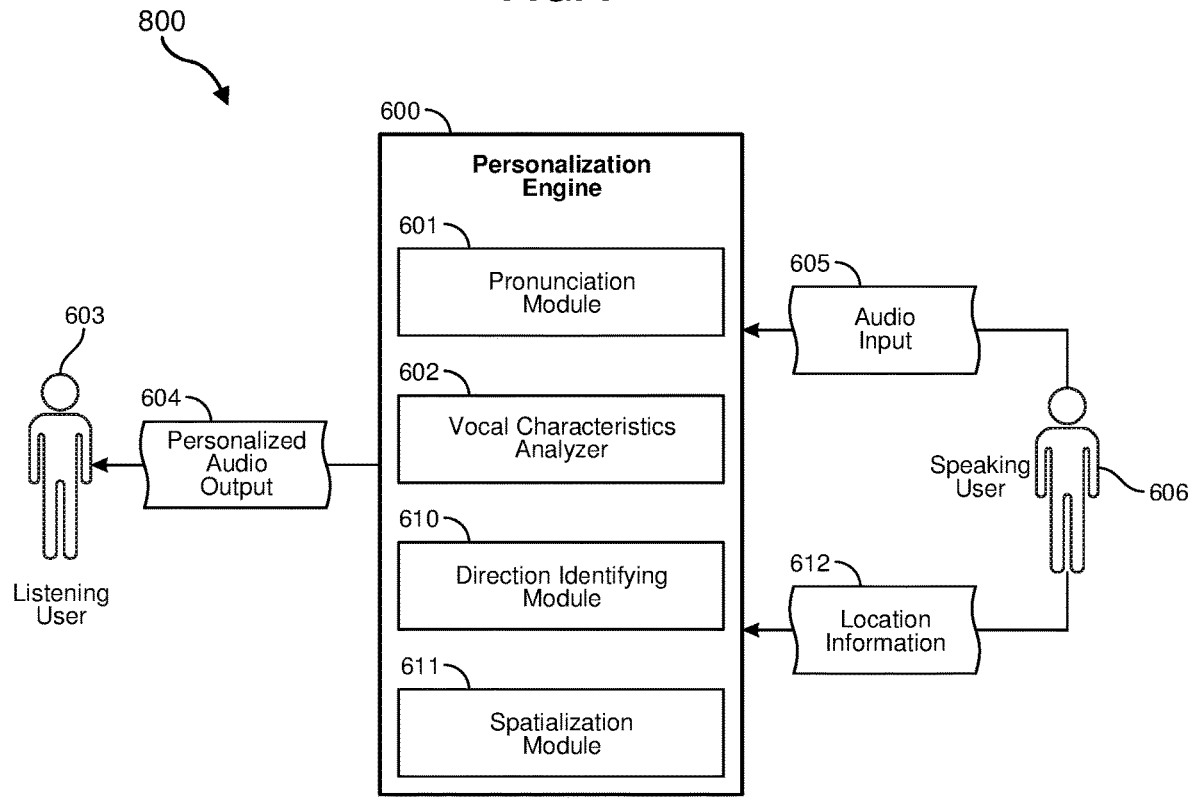
FIG. 8 illustrates an alternative computing architecture in which natural language translation in AR may be personalized to a user.
Figure 9:
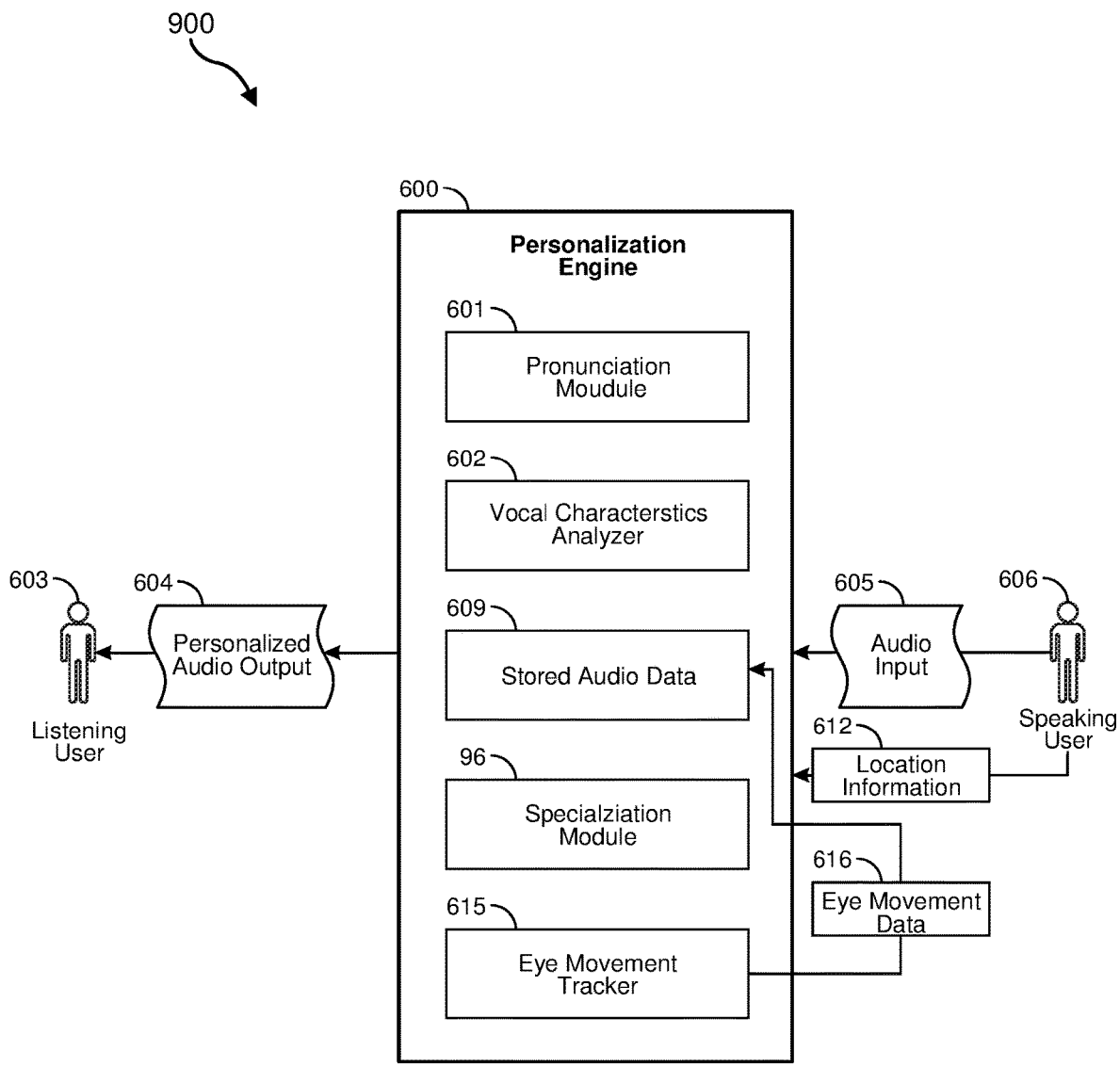
FIG. 9 illustrates an alternative computing architecture in which natural language translation in AR may be personalized to a user.

In some cases, as shown in computing environment 700 of FIG. 7, the speaking user 606 may provide voice samples or a voice model. For instance, the speaking user 606 may provide voice model 608 which includes the user's pronunciations, tone and other vocal characteristics, which may be used to form a voice profile. In such an embodiment, the personalization engine 600 may forego a live analysis of the speaking user's voice and may use characteristics and pronunciations in the voice model 608 to personalize the audio output 604. The voice model 608 may include voice samples that may be used to determine how the speaking user pronounces the words or syllables prior to receiving the audio input stream 605 from the speaking user. The voice model interpreter 607 may interpret the data in the voice model and use it when personalizing the spoken words that are sent to the listening user. In some embodiments, instead of foregoing the live analysis of the speaking user's voice, the personalization engine 600 may use data from the voice model 608 in combination with a live analysis of the speaking user's words to further refine the personalization. In such cases, the refinements from the live analysis may be added to the user's voice model or may be used to update the user's voice model 608.

In some cases, the personalization engine 600 may access stored audio data 613 associated with the speaking user 606, and then use the accessed stored audio data to personalize the generated spoken words. The stored audio data 613 may include, for example, prerecorded words spoken by the speaking user 606. These prerecorded words may be used to create a voice model or voice profile associated with that user. This voice model may then be used to personalize the speaking user's voice for the audio output 604 sent to the listening user 603. As such, the generated spoken words replayed in the new (translated) language sound as if spoken by the speaking user 606.

In some cases, the personalization engine 600 may parse the words spoken by the speaking user 606. In some examples, the speaking user 606 and the listening user 603 may speak different languages that nonetheless share some similar words. For instance, some languages may share similar terms for computing technology borrowed directly from English. In such cases, the personalization engine 600 may parse the words spoken by the speaking user 606 and determine that at least one of the words is spoken in a language understood by the listening user 603. If such a determination is made, the personalization engine may cause active noise cancellation to be paused temporarily for the words spoken in the language understood by the listening user. As such, those words may be heard by the listening user, without noise cancellation, and without translation.

Replaying the generated spoken words 604 to the listening user 603 may additionally or alternatively include determining which direction the speaking user is speaking from, and spatializing playback of the generated spoken words to sound as if the spoken words are coming from the determined direction of the speaking user. For instance, as shown in computing environment 800 of FIG. 8, a speaking user 606 may provide location information 612 associated with that user. The location data may indicate where the user is based on global positioning system (GPS) coordinates or may indicate where the user is within a given room, dance hall, stadium or other venue. The direction identifying module 610 of the personalization engine 600 may use the location data 612 to determine which direction the speaking user is speaking from. Then, the spatialization module 611 may spatialize playback of the generated spoken words in audio output 604 to sound as if the spoken words are coming from the determined direction of the speaking user 606. The spatialization module 611 may apply various acoustic processing techniques to make the speaking user's voice sound as if it is behind the listening user 603, or to the right or left of the listening user, or in front of or far away from the listening user. Thus, the personalized voice speaking the translated words may not only sound as if spoken by the speaking user, but also sound as if coming from the precise location of the speaking user, relative to the location of the listening user.

In some embodiments, determining which direction the speaking user is speaking from may include calculating a direction of arrival for sound waves coming from the speaking user. For example, the direction identifying module 610 of FIG. 8 may calculate a direction of arrival for sound waves in the audio input 605 coming from speaking user 606. The personalization engine 600 may then determine which direction the speaking user 606 is speaking from based on the calculated direction of arrival, and the spatialization module 611 may spatialize playback of the generated spoken words in personalized audio output 604 to sound as if the spoken words are coming from the determined direction of the speaking user. In some cases, this direction of arrival calculation may be performed in addition to receiving the location data 612 to further refine the location of the speaking user 606. In other cases, the direction of arrival calculation may be performed without receiving location data 612. As such, the speaking user's location may be determined without the user sending specific data indicating their current location. For example, the listening user may implement a mobile device with a camera or may wear an AR headset with a camera. The direction identifying module 610 may analyze the video feed from the camera(s) to determine the direction of the speaking user, and then spatialize the audio based on the determined direction.

Additionally or alternatively, determining which direction the speaking user 606 is speaking may include tracking movement of the listening user's eyes. For instance, the personalization engine 600 (which may be part of or in communication with an AR head set) may include an eye movement tracker. As shown in computing environment 900 of FIG. 9, for example, the personalization engine 600 may include an eye movement tracker 615 which generates eye movement data 616. The eye movement tracker 615 may be part of AR headset 630A and may be configured to track a user's eyes (e.g., listening user 603's eyes) and determine where the user is looking. In most instances, if a speaking user is speaking to the listening user, the listening user will turn and look at the speaking user to actively listen to them. As such, tracking the listening user's eye movements may provide clues as to where the speaking user 606 is speaking from. The direction identifying module 610 may then use the eye movement data 616 to determine which direction the speaking user 606 is speaking from based on the tracked movements of the listening user's eyes. The spatialization module 611 may then spatialize playback of the generated spoken words to sound as if the spoken words are coming from the determined direction of the speaking user in the manner noted above.

In some embodiments, processing an audio input stream to identify words spoken by a speaking user may include implementing a speech-to-text (STT) program to identify the words spoken by the speaking user, and may further include a text-to-speech (US) program to generate the translated spoken words. As shown in computing environment 1000 of FIG. 10, the speaking user's words (e.g., in audio input 1006 from speaking user 1007) may be fed to the speech-to-text module 1005 where the words are converted to text or some other digital representation of a word. The translation module 1004 may then use the words in text form to perform the translation from one language to another language. Once the translation has been performed, the text-to-speech module 1003 may convert the written words to speech. That speech may be included in audio output 1002. This audio output 1002 may then be sent to the listening user 1001. Accordingly, some embodiments may use STT and TTS to perform the conversions between speech and text, and back to speech.

Computing environment 1100 of FIG. 11 illustrates an example in which multiple speaking users are speaking at the same time. Each speaking user (e.g., 1105 or 1107) may provide an audio input stream (e.g., 1104 or 1106, respectively) that includes words spoken by the two different users. A speech differentiation module 1103 (which may be part of the personalization engine 600 of FIG. 6 and/or part of the computer system 401 of FIG. 4) may then differentiate between the two speaking users 1105 and 1107 according to different vocal patterns or other vocal characteristics. The speech differentiation module 1103 may then generate spoken words in speech output 1102 for one speaking user (e.g., 1105), while performing active noise cancellation on both speaking users. In this manner, the listening user 1101 (who does not understand the language spoken by the two users) can still receive a translated version of speaking user 1105's words.

In some embodiments, the audio input stream 1106 from the other speaking user 1107 may be stored in a data store. This stored audio stream may then be parsed and translated. Then, when speaking user 1105 is finished speaking, the speech differentiation module 1103 may cause speaking user 1107's stored and translated words to be converted into spoken words. In some cases, the speech differentiation module 1103 may run according to policy indicating that, if two (or more) speaking users are speaking, one speaker will be chosen (perhaps based on eye tracking information to see which speaking user the listening user is looking at), and words from other speaking users will be stored. Then, once the speech differentiation module 1103 determines that the first speaking user has stopped talking for a specified amount of time, the generated spoken words for the other speaking user(s) will be played back sequentially to the listening user. In some cases, the policy may favor certain speaking users based on their identity. Thus, even if the listening user 1101 is in a crowd of people, the systems herein may focus on a single speaking user (based on that user's vocal characteristics, for example) or set of users and record audio from those users. This audio may then be converted to text, translated, converted back to speech and played back to the listening user 1101.

In some cases, when multiple users are speaking, the personalization engine 400 of FIG. 4 may create a voice models for each of the speaking users or may create a voice model of the secondary speaking users while the first speaking user is speaking. The personalization engine 400 may also personalize the generated spoken words for each of simultaneously speaking users. As such, the generated spoken words in the new (translated) language may sound as if coming from each different speaking user's voice. Accordingly, whether two persons are conversing one-on-one, or chatting in a large group, the embodiments herein may operate to silence audio from the speaker, translate the speaker's words, and play a personalized spoken translation of the speaker's words back to the listening user.

In addition, a corresponding system for performing natural language translation in AR may include several modules stored in memory, including an audio accessing module that accesses an audio input stream that includes words spoken by a speaking user in a first language. The system may also include a noise cancellation module that performs active noise cancellation on the words in the audio input stream so that the spoken words are suppressed or are substantially inaudible to a listening user. The system may further include an audio processing module that processes the audio input stream to identify the words spoken by the speaking user. A translation module may translate the identified words spoken by the speaking user into a second, different language, and a speech generator may generate spoken words in the second, different language using the translated words. A playback module may then replay the generated spoken words in the second language to the listening user.

In some examples, the above-described method may be encoded as computer-readable instructions on a computer-readable medium. For example, a computer-readable medium may include one or more computer-executable instructions that, when executed by at least one processor of a computing device, may cause the computing device to access an audio input stream that includes words spoken by a speaking user in a first language, perform active noise cancellation on the words in the audio input stream such that the spoken words are suppressed or are substantially inaudible to a listening user, process the audio input stream to identify the words spoken by the speaking user, translate the identified words spoken by the speaking user into a second, different language, generate spoken words in the second, different language using the translated words, and replay the generated spoken words in the second language to the listening user.

Accordingly, two (or more) users may converse with each other, each speaking their own language. Each user's speech is muted for the other user and is translated and spoken back to the listening user in the speaking user's voice. Thus, users who speak different languages may speak to each other freely, hearing only personalized, translated speech. This may significantly help users in communicating with each other, especially when they do not speak the same language.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. A computer-implemented method comprising:
   accessing an audio input stream that includes one or more words spoken by a speaking user in a first language and one or more words spoken by a further speaking user;
   performing active noise cancellation on the one or more words in the audio input stream including generating a noise cancellation signal configured to substantially cancel out the audio input stream received from the speaking user;
   applying the generated noise cancellation signal to the audio input stream to suppress the spoken words of the speaking user;
   processing the audio input stream to identify the one or more words spoken by the speaking user;
   determining that a first plurality of the words spoken by the speaking user are spoken in a language not understood by a listening user and that a second plurality of the words spoken by the speaking user are spoken in a language understood by the listening user;
   pausing active noise cancellation for the second plurality of the words that are spoken in the language understood by the listening user;
   translating the first plurality of the identified words spoken by the speaking user into a second, different language;
   generating spoken words in the second, different language using the translated words while performing active noise cancellation on the speaking user and on the further speaking user;
   generating spoken words for the words spoken by the further speaking user that were suppressed by the active noise cancellation;
   storing the generated spoken words for the further speaking user until the speaking user has stopped speaking for a specified amount of time; and
   replaying the generated spoken words in the second language to the listening user, wherein the audio input stream provided to the listening user includes a mixture of original speech of the speaking user including the second plurality of words during which active noise cancellation is paused and the generated spoken words replayed in the second language, and wherein the stored generated spoken words for the further speaking user are sequentially played back to the listening user after the speaking user has stopped speaking for the specified amount of time.

2. The computer-implemented method of claim 1, wherein the generated spoken words are personalized to the speaking user, such that the generated spoken words in the second language sound as if spoken by the speaking user.

3. The computer-implemented method of claim 2, wherein personalizing the generated spoken words further comprises:
   processing the audio input stream to determine how the speaking user pronounces one or more words or syllables; and applying the determined pronunciations to the generated spoken words.

4. The computer-implemented method of claim 3, wherein during replay of the generated spoken words, personalizations are applied dynamically to the replayed words as the computer determines how the speaking user pronounces the words or syllables.

5. The computer-implemented method of claim 3, wherein the speaking user provides one or more voice samples, using which the computer determines how the speaking user pronounces the one or more of the words or syllables prior to receiving the audio input stream.

6. The computer-implemented method of claim 1, wherein replaying the generated spoken words to the listening user further comprises:
   determining which direction the speaking user is speaking from; and
   spatializing playback of the generate d spoken words to sound as if the spoken words are coming from the determined direction of the speaking user.

7. The computer-implemented method of claim 6, wherein determining which direction the speaking user is speaking from further comprises:
   receiving location data for a device associated with the speaking user;
   determining which direction the speaking user is speaking from based on the received location data; and
   spatializing playback of the generated spoken words to sound as if the spoken words are coming from the determined direction of the speaking user.

8. The computer-implemented method of claim 6, wherein determining which direction the speaking user is speaking from further comprises:
   calculating a direction of arrival for sound waves coming from the speaking user;
   determining which direction the speaking user is speaking from based on the calculated direction of arrival; and
   spatializing playback of the generated spoken words to sound as if the spoken words are coming from the determined direction of the speaking user.

9. The computer-implemented method of claim 6, wherein determining which direction the speaking user is speaking from further comprises:
   tracking movement of the listening user's eyes;
   determining which direction the speaking user is speaking from based on the tracked movements of the listening user's eyes; and
   spatializing playback of the generated spoken words to sound as if the spoken words are coming from the determined direction of the speaking user.

10. The computer-implemented method of claim 1, wherein processing the audio input stream to identify the one or more words spoken by the speaking user comprises implementing a speech-to-text (STT) program to identify the words spoken by the speaking user, and a text-to-speech (TTS) program to generate the translated spoken words.

11. A system comprising:
   at least one physical processor;
   physical memory comprising computer-executable instructions that, when executed by the physical processor, cause the physical processor to:
      access an audio input stream that includes one or more words spoken by a speaking user in a first language and one or more words spoken by a further speaking user;
      perform active noise cancellation on the one or more words in the audio input stream including generating a noise cancellation signal configured to substantially cancel out the audio input stream received from the speaking user;
      apply the generated noise cancellation signal to the audio input stream to suppress the spoken words of the speaking user;
      process the audio input stream to identify the one or more words spoken by the speaking user;
      determine that a first plurality of the words spoken by the speaking user are spoken in a language not understood by a listening user and that a second plurality of the words spoken by the speaking user are spoken in a language understood by the listening user;
      pause active noise cancellation for the second plurality of the words that are spoken in the language understood by the listening user;
      translate the first plurality of the identified words spoken by the speaking user into a second, different language;
      generate spoken words in the second, different language using the translated words while performing active noise cancellation on the speaking user and on the further speaking user;
      generate spoken words for the words spoken by the further speaking user that were suppressed by the active noise cancellation;
      store the generated spoken words for the further speaking user until the speaking user has stopped speaking for a specified amount of time; and
      replay the generated spoken words in the second language to the listening user, wherein the audio input stream provided to the listening user includes a mixture of original speech of the speaking user including the second plurality of words during which active noise cancellation is paused and the generated spoken words replayed in the second language, and wherein the stored generated spoken words for the further speaking user are sequentially played back to the listening user after the speaking user has stopped speaking for the specified amount of time.

12. The system of claim 11, further comprising:
   downloading a voice profile associated with the speaking user; and
   using the downloaded voice profile associated with the speaking user to personalize the generated spoken words, such that the replayed generated spoken words in the second language sound as if spoken by the speaking user.

13. The system of claim 11, further comprising:
   accessing one or more portions of stored audio data associated with the speaking user; and
   using the accessed stored audio data to personalize the generated spoken words, such that the generated spoken words replayed in the second language sound as if spoken by the speaking user.

14. The system of claim 11, further comprising:
   parsing the words spoken by the speaking user;
   determining that at least one of the words is spoken in a language understood by the listening user; and
   pausing active noise cancellation for the words spoken in the language understood by the listening user.

15. The system of claim 11, further comprising:
   determining that the audio input stream includes words spoken by at least two different speaking users;
   differentiating between the two speaking users according to one or more voice patterns; and generating spoken words for a first speaking user, while performing active noise cancellation on both speaking users.

16. The system of claim 15, further comprising:
storing generated spoken words for the second speaking user until the first user has stopped talking for a specified amount of time; and
replaying the generated spoken words for the second speaking user.

17. The system of claim 16, further comprising personalizing the generated spoken words for each of the two speaking users, such that the generated spoken words in the second language sound as if coming from each speaking user's voice.

18. The system of claim 11, wherein at least a portion of the computer-executable instructions stored on the physical memory are processed by at least one remote physical processor that is separate from the system.

19. The system of claim 18, wherein one or more policies indicate when and which portions of the computer-executable instructions are to be processed on the at least one remote physical processor that is separate from the system.

20. A non-transitory computer-readable medium comprising one or more computer-executable instructions that, when executed by at least one processor of a computing device, cause the computing device to:
access an audio input stream that includes one or more words spoken by a speaking user in a first language and one or more words spoken by a further speaking user;
perform active noise cancellation on the one or more words in the audio input stream including generating a noise cancellation signal configured to substantially cancel out the audio input stream received from the speaking user;
apply the generated noise cancellation signal to the audio input stream to suppress the spoken words of the speaking user;
process the audio input stream to identify the one or more words spoken by the speaking user;
determine that a first plurality of the words spoken by the speaking user are spoken in a language not understood by a listening user and that a second plurality of the words spoken by the speaking user are spoken in a language understood by the listening user;
pause active noise cancellation for the second plurality of the words that are spoken in the language understood by the listening user;
translate the first plurality of the identified words spoken by the speaking user into a second, different language;
generate spoken words in the second, different language using the translated words while performing active noise cancellation on the speaking user and on the further speaking user;
generate spoken words for the words spoken by the further speaking user that were suppressed by the active noise cancellation;
store the generated spoken words for the further speaking user until the speaking user has stopped speaking for a specified amount of time; and
replay the generated spoken words in the second language to the listening user, wherein the audio input stream provided to the listening user includes a mixture of original speech of the speaking user including the second plurality of words during which active noise cancellation is paused and the generated spoken words replayed in the second language, and wherein the stored generated spoken words for the further speaking user are sequentially played back to the listening user after the speaking user has stopped speaking for the specified amount of time.

* * * * *